United States Patent
Nakao

(10) Patent No.: US 9,083,188 B2
(45) Date of Patent: Jul. 14, 2015

(54) BALANCE CORRECTING APPARATUS AND ELECTRICITY STORAGE SYSTEM

(71) Applicant: EVTD Inc., Tokyo (JP)

(72) Inventor: Fumiaki Nakao, Shizuoka (JP)

(73) Assignee: EVTD Inc., Tokyo (JP)

( * ) Notice: Subject to any disclaimer, the term of this patent is extended or adjusted under 35 U.S.C. 154(b) by 0 days.

(21) Appl. No.: 14/032,198

(22) Filed: Sep. 20, 2013

(65) Prior Publication Data

US 2014/0015475 A1    Jan. 16, 2014

Related U.S. Application Data

(63) Continuation of application No. PCT/JP2012/002123, filed on Mar. 27, 2012.

(30) Foreign Application Priority Data

Mar. 31, 2011  (JP) .................................. 2011-079755

(51) Int. Cl.
*H02J 7/00*    (2006.01)
*H01M 10/42*    (2006.01)

(52) U.S. Cl.
CPC ........... *H02J 7/0016* (2013.01); *H01M 10/425* (2013.01); *H02J 7/0018* (2013.01); *H01M 2010/4271* (2013.01)

(58) Field of Classification Search
USPC ......................................... 320/118, 103–104
See application file for complete search history.

(56) References Cited

U.S. PATENT DOCUMENTS

| 6,140,800 A | * | 10/2000 | Peterson ........................ 320/118 |
| 7,446,575 B2 | * | 11/2008 | Yano et al. .................... 320/121 |
| 2010/0253286 A1 | * | 10/2010 | Sutardja ........................ 320/118 |
| 2011/0025274 A1 | | 2/2011 | Kunkel et al. |

FOREIGN PATENT DOCUMENTS

| JP | H10-257683 A | 9/1998 |
| JP | 2004-129439 A | 4/2004 |
| JP | 2006-067742 A | 3/2006 |

(Continued)

OTHER PUBLICATIONS

International Preliminary Report on Patentability for International Application No. PCT/JP2012/002123, issued by the International Bureau of WIPO on Oct. 10, 2013.
International Search Report for International Application No. PCT/JP2012/002123, issued by the Japanese Patent Office on Apr. 24, 2012.
Extended European Search Report for European Patent Application No. 12 764 104.1, issued by the European Patent Office on Sep. 2, 2014.

(Continued)

*Primary Examiner* — Edward Tso
*Assistant Examiner* — Robert Grant

(57) ABSTRACT

An object of the present invention is to suppress damages to a drive circuit for a switching device due to a counter electromotive force of an inductor. A balance correcting apparatus includes: an inductor; a first switching device; a second switching device; a control signal generating unit that has a first reference voltage input terminal electrically connected to the other end of the first electricity storage cell and a second reference voltage input terminal electrically connected to the other end of the second electricity storage cell, and allows the first switching device and the second switching device to perform an ON-OFF operation alternately; and a voltage stabilizing circuit that keeps a voltage difference between the voltages of the first reference voltage input terminal and the second reference voltage input terminal to be within a predetermined range.

11 Claims, 4 Drawing Sheets

(56) References Cited

FOREIGN PATENT DOCUMENTS

| | | |
|---|---|---|
| JP | 2008-017605 A | 1/2008 |
| JP | 2008-054415 A | 3/2008 |
| JP | 2009-232660 A | 10/2009 |

OTHER PUBLICATIONS

Notice of First Office Action for Patent Application No. 201280015549.7, issued by the Chinese Intellectual Property Office on Apr. 9, 2015.

* cited by examiner

BALANCE CORRECTING APPARATUS AND ELECTRICITY STORAGE SYSTEM

BACKGROUND

1. Technical Field

The present invention relates to a balance correcting apparatus and an electricity storage system.

The contents of the following Japanese patent application and PCT patent application are incorporated herein by reference:

NO. 2011-079755 filed in JP on Mar. 31, 2011, and
NO. PCT/JP2012/002123 filed on Mar. 27, 2012.

2. Related Art

When a number of electricity storage cells that are connected in series are used, the lives of the electricity storage cells may become shorter if voltages of the electricity storage cells are different from each other. In view of the circumstance, a balance correcting circuit that includes an inductor, a switching device, and a drive circuit for the switching device, and equalizes voltages of electricity storage cells has been proposed (please see Patent Literatures 1 to 3).

PRIOR ART DOCUMENTS

Patent Literature (Patent Literature 1) Japanese Patent Application Publication No. 2006-067742
(Patent Literature 2) Japanese Patent Application Publication No. 2008-017605
(Patent Literature 3) Japanese Patent Application Publication No. 2009-232660

SUMMARY

For example, when a product is inspected by using an inspection device and a balance correcting apparatus that are connected by using a contact pin, the connection between the inspection device and the balance correcting apparatus may be disconnected due to chattering. When the connection between the power source and the balance correcting apparatus is disconnected during operation of the balance correcting apparatus, damages may be caused to a drive circuit for a switching device due to a counter electromotive force of an inductor. Accordingly, an object of an aspect of the present invention is to provide a balance correcting apparatus and an electricity storage system that can solve the problem. The object can be achieved by combinations of features described in the independent claims. The dependent claims provide other specific advantageous examples of the present invention.

A first aspect of the present invention provides a balance correcting apparatus that equalizes voltages of a first electricity storage cell and a second electricity storage cell that are connected in series, the balance correcting apparatus including:

an inductor having one end that is electrically connected to a connection point between one end of the first electricity storage cell and one end of the second electricity storage cell;

a first switching device that is electrically connected between the other end of the inductor and the other end of the first electricity storage cell;

a second switching device that is electrically connected between the other end of the inductor and the other end of the second electricity storage cell;

a control signal generating unit that has a first reference voltage input terminal electrically connected to the other end of the first electricity storage cell and a second reference voltage input terminal electrically connected to the other end of the second electricity storage cell, and supplies, to the first switching device and the second switching device, a control signal for controlling an ON-OFF operation of the first switching device and the second switching device to allow the first switching device and the second switching device to perform an ON-OFF operation alternately; and a voltage stabilizing circuit that keeps a voltage difference between the voltages of the first reference voltage input terminal and the second reference voltage input terminal to be within a predetermined range.

In the balance correcting apparatus,
the voltage stabilizing circuit may have a shunt regulator, and
the shunt regulator may:
include one end electrically connected to the other end of the inductor; and
include the other end electrically connected to the second reference voltage input terminal of the control signal generating unit. In the balance correcting apparatus, the shunt regulator may allow current to flow from the one end of the shunt regulator to the other end of the shunt regulator when a voltage difference between voltages of the one end of and the other end of the shunt regulator is larger than a predetermined value.

In the balance correcting apparatus,
the voltage stabilizing circuit may have a shunt regulator; and
the shunt regulator may:
include one end electrically connected to the first reference voltage input terminal of the control signal generating unit; and
include the other end electrically connected to the other end of the inductor. In the balance correcting apparatus, the shunt regulator may allow current to flow from the one end of the shunt regulator to the other end of the shunt regulator when a voltage difference between voltages of the one end of and the other end of the shunt regulator is larger than a predetermined value.

In the balance correcting apparatus,
the first switching device may have a first diode that is provided in parallel with the first switching device, and allows current to flow in a direction from the other end of the inductor to the other end of the first electricity storage cell, and
the second switching device may have a second diode that is provided in parallel with the second switching device, and allows current to flow in a direction from the other end of the second electricity storage cell to the other end of the inductor. In the balance correcting apparatus, the voltage stabilizing circuit may have a shunt regulator, and
the shunt regulator may:
include one end electrically connected to the first reference voltage input terminal; and
include the other end electrically connected to the second reference voltage input terminal. In the balance correcting apparatus, the shunt regulator may allow current to flow from the one end of the shunt regulator to the other end of the shunt regulator when a voltage difference between voltages of the one end of and the other end of the shunt regulator is larger than a predetermined value.

In the balance correcting apparatus, the shunt regulator may include a zener diode.

A second aspect of the present invention provides an electricity storage system including:

a first electricity storage cell and a second electricity storage cell that are connected in series, and the balance correcting apparatus that equalizes voltages of the first electricity storage cell and the second electricity storage cell.

The summary clause does not necessarily describe all necessary features of the embodiments of the present invention. The present invention may also be a sub-combination of the features described above.

DESCRIPTION OF EXEMPLARY EMBODIMENTS

Figure 1:
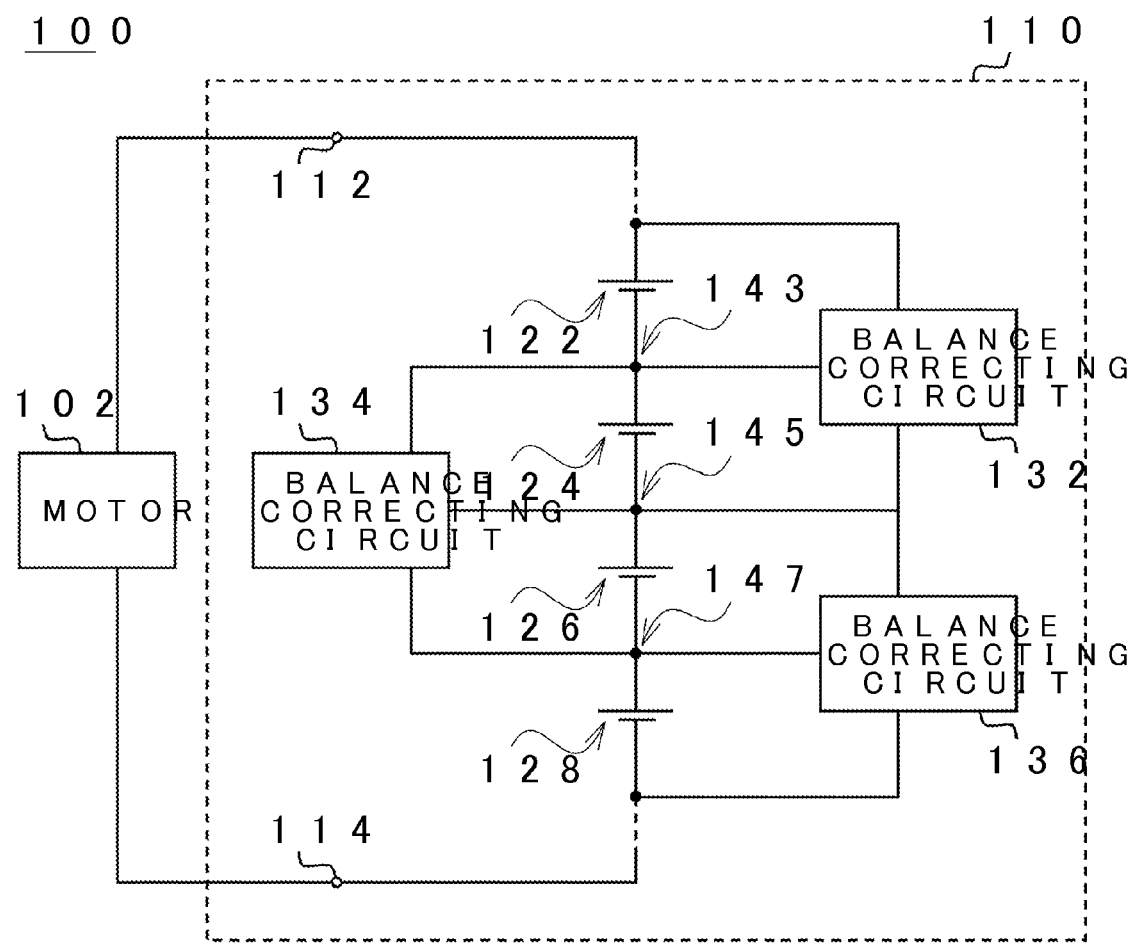
FIG. 1 schematically shows an example of a device 100 including an electricity storage system 110.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Also, embodiments are explained with reference to figures, in which like reference numerals are given to the same or similar parts, and explanation thereof may not be repeated.

FIG. 1 schematically shows an example of a device 100 including an electricity storage system 110. The device 100 includes a motor 102, and the electricity storage system 110. The device 100 may be a transport device such as an electric car, a hybrid car, an electric motorcycle, a railway vehicle, and an elevator. The device 100 may be electric equipment such as a PC, and a mobile phone.

The electricity storage system 110 has: a terminal 112; a terminal 114; a plurality of serially connected electricity storage cells including an electricity storage cell 122, an electricity storage cell 124, an electricity storage cell 126, and an electricity storage cell 128; and a plurality of balance correcting circuits including a balance correcting circuit 132, a balance correcting circuit 134, and a balance correcting circuit 136. The balance correcting circuit 132, the balance correcting circuit 134, and the balance correcting circuit 136 may be examples of a balance correcting apparatus.

When two elements are "electrically connected", the elements may not be mutually directly connected. A third element may be provided therebetween. Also, the elements may not be connected physically. For example, an input winding of and an output winding of a transformer are not connected physically, but are connected electrically. Furthermore, the elements are said to be electrically connected even if the elements are electrically connected only when an electricity storage cell and a balance correcting circuit are electrically connected. Also, when two elements are "connected in series", the elements are electrically connected in series.

The motor 102 is electrically connected to the electricity storage system 110, and uses electricity supplied by the electricity storage system 110. The motor 102 may be an example of an electric load. The motor 102 may be used as a regeneration brake. The electricity storage system 110 is electrically connected to the motor 102, and supplies electricity to the motor 102. The electricity storage system 110 is electrically connected to an unillustrated charging device, and stores therein electric energy.

The terminal 112 and the terminal 114 electrically connect a device that is provided outside the system, such as the motor 102 and the charging device, with the electricity storage system 110. The electricity storage cell 122, the electricity storage cell 124, the electricity storage cell 126, and the electricity storage cell 128 are connected in series. The electricity storage cell 122, the electricity storage cell 124, the electricity storage cell 126, and the electricity storage cell 128 may be a secondary battery or a capacitor. The electricity storage cell 122, the electricity storage cell 124, the electricity storage cell 126, and the electricity storage cell 128 may each include a plurality of electricity storage cells.

For example, if the manufacturing quality, the degree of degradation, and the like are different between the electricity storage cell 122 and the electricity storage cell 124, there may be differences between the battery characteristics of the electricity storage cell 122 and the electricity storage cell 124. Examples of the battery characteristics include a battery capacity, and a discharge voltage characteristic that represents a relationship of a battery voltage with discharge time. For example, as the degradation of an electricity storage cell progresses, the battery voltage lowers in shorter discharge time.

When the battery characteristics are different between the electricity storage cell 122 and the electricity storage cell 124, the voltage of the electricity storage cell 122 may become different from the voltage of the electricity storage cell 124 as discharge of the electricity storage system 110 progresses, even if the voltages of the electricity storage cell 122 and the electricity storage cell 124 are substantially the same after the completion of charging of the electricity storage system 110. Also, the voltage of the electricity storage cell 122 may become different from the voltage of the electricity storage cell 124 as charging of the electricity storage system 110 progresses, even if the voltages of the electricity storage cell 122 and the electricity storage cell 124 are substantially the same at the start of charging of the electricity storage system 110.

Because a range of an available charge level (sometimes referred to as a state of charge (SOC)) is predetermined for the electricity storage cell 122 and the electricity storage cell 124, the utilization efficiency of the electricity storage system 110 deteriorates when there is a difference in voltages of the electricity storage cell 122 and the electricity storage cell 124. The utilization efficiency of the electricity storage system 110 can be enhanced by equalizing voltages of the electricity storage cell 122 and the electricity storage cell 124.

The balance correcting circuit 132 has an inductor, and equalizes voltages of the electricity storage cell 122 and the electricity storage cell 124. The balance correcting circuit 132 is electrically connected to one end on the terminal 112 side (sometimes referred to as a positive electrode side) of the electricity storage cell 122, and to a connection point 143 between one end on the terminal 114 side (sometimes referred to as a negative electrode side) of the electricity storage cell 122, and a positive electrode side of the electricity storage cell 124. Thereby, a circuit including the electricity storage cell 122 and the inductor is formed. The balance correcting circuit 132 is electrically connected to the connection point 143, and to a connection point 145 between a negative electrode side of the electricity storage cell 124 and a positive electrode side of the electricity storage cell 126. Thereby, a circuit including the electricity storage cell 124 and the inductor is formed.

The balance correcting circuit 132 allows current to flow alternately through the circuit including the electricity storage cell 122 and the inductor, and through the circuit including the electricity storage cell 124 and the inductor. Thereby, the electricity storage cell 122 and the electricity storage cell 124 can mutually exchange electric energy via the inductor. As a result, voltages of the electricity storage cell 122 and the electricity storage cell 124 can be equalized.

The balance correcting circuit 134 equalizes voltages of the electricity storage cell 124 and the electricity storage cell 126. The balance correcting circuit 134 is electrically connected to the connection point 143, to the connection point 145, and to a connection point 147 between a negative electrode side of the electricity storage cell 126, and a positive electrode side of the electricity storage cell 128. The balance correcting circuit 136 equalizes voltages of the electricity storage cell 126 and the electricity storage cell 128. The balance correcting circuit 136 is electrically connected to the connection point 145, to the connection point 147, and to a negative electrode side of the electricity storage cell 128. The balance correcting circuit 134 and the balance correcting circuit 136 may have the same configurations with that of the balance correcting circuit 132.

Figure 2:
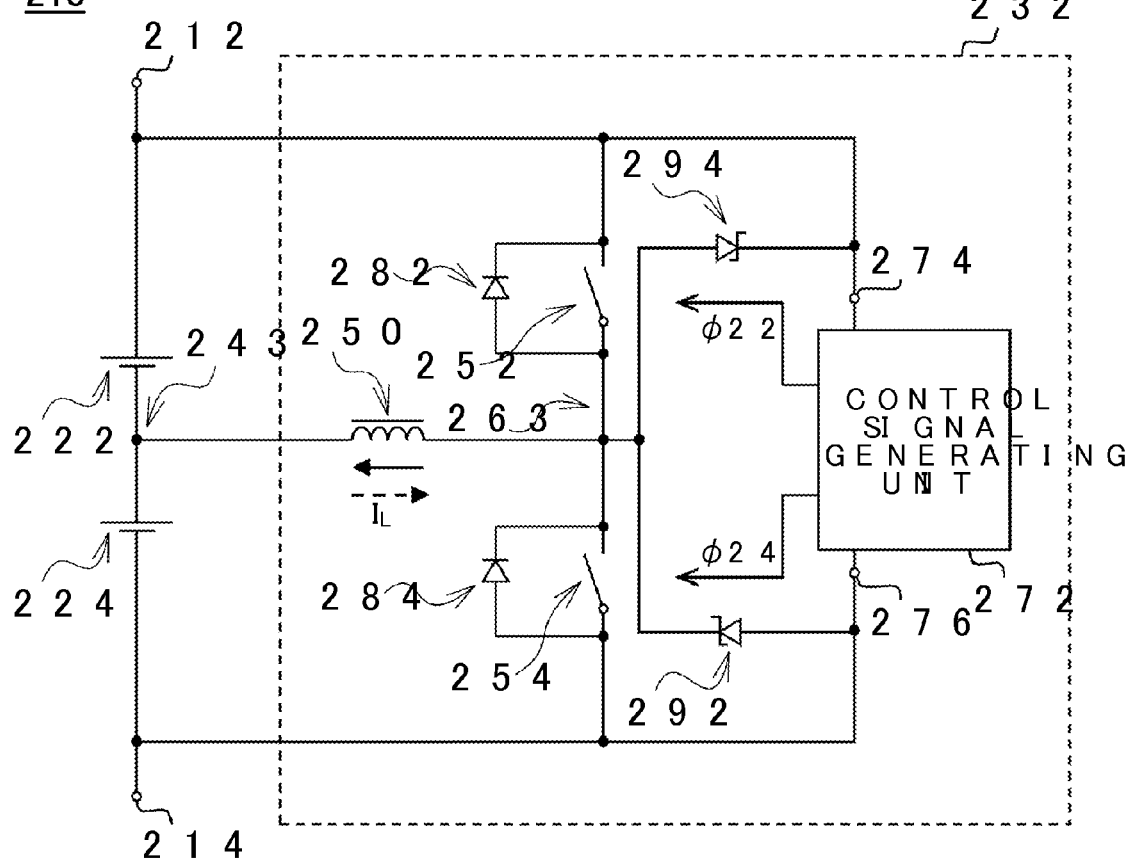
FIG. 2 schematically shows an example of an electricity storage system 210.

FIG. 2 schematically shows an example of an electricity storage system 210. The electricity storage system 210 includes a terminal 212, a terminal 214, an electricity storage cell 222 and an electricity storage cell 224 that are connected in series, and a balance correcting circuit 232. The balance correcting circuit 232 may be an example of a balance correcting apparatus. The electricity storage cell 222 may be an example of a first electricity storage cell. The electricity storage cell 224 may be an example of a second electricity storage cell.

The terminal 212 may have the same configuration with that of the terminal 112 of the electricity storage system 110, and the terminal 214 may have the same configuration with that of the terminal 114 of the electricity storage system 110. The electricity storage cell 222 and the electricity storage cell 224 may have the same configurations with that of the electricity storage cell 122, the electricity storage cell 124, the electricity storage cell 126, or the electricity storage cell 128. Also, the electricity storage system 110 may have the same configuration with that of the electricity storage system 210. The balance correcting circuit 132, the balance correcting circuit 134, and the balance correcting circuit 136 may have the same configurations with that of the balance correcting circuit 232.

The balance correcting circuit 232 equalizes voltages of the electricity storage cell 222 and the electricity storage cell 224. The balance correcting circuit 232 includes an inductor 250, a switching device 252, a switching device 254, a control signal generating unit 272, a diode 282, a diode 284, a zener diode 292, and a zener diode 294. The switching device 252 may be an example of a first switching device. The switching device 254 may be an example of a second switching device. Each of the zener diode 292 and the zener diode 294 may be an example of a shunt regulator and a voltage stabilizing circuit.

The balance correcting circuit 232 is electrically connected to a positive electrode side of the electricity storage cell 222, and to a connection point 243 between a negative electrode side of the electricity storage cell 222 and a positive electrode side of the electricity storage cell 224. Thereby, a first opening/closing circuit including the electricity storage cell 222, the switching device 252, and the inductor 250 is formed. The balance correcting circuit 232 is electrically connected to the connection point 243, and to a negative electrode side of the electricity storage cell 224. Thereby, a second opening/closing circuit including the electricity storage cell 224, the inductor 250, and the switching device 254 is formed. The connection point 243 may be an example of a connection point between one end of a first electricity storage cell, and one end of a second electricity storage cell.

The inductor 250 has one end electrically connected to the connection point 243. The other end of the inductor 250 may be electrically connected to a connection point 263 between the switching device 252 and the switching device 254. When the switching device 252 and the switching device 254 alternately repeat an ON operation and an OFF operation (sometimes referred to as an ON-OFF operation), an inductor current $I_L$ is generated at the inductor 250.

The switching device 252 is electrically connected between the other end of the inductor 250 and the positive electrode side of the electricity storage cell 222. The switching device 252 receives a control signal $\phi 22$ from the control signal generating unit 272, and performs an ON operation or an OFF operation based on the control signal $\phi 22$. Thereby, the first opening/closing circuit is opened or closed. The switching device 252 may be a MOSFET. The switching device 252 may be a device that performs an OFF operation when not receiving the control signal $\phi 22$.

The switching device 254 is electrically connected between the other end of the inductor 250 and the negative electrode side of the electricity storage cell 224. The switching device 254 receives a control signal $\phi 24$ from the control signal generating unit 272, and performs an ON operation or an OFF operation based on the control signal $\phi 24$. Thereby, the second opening/closing circuit is opened or closed. The switching device 254 may be a MOSFET. The switching device 254 may be a device that performs an OFF operation when not receiving the control signal $\phi 24$.

The control signal generating unit 272 generates the control signal $\phi 22$ for controlling an ON-OFF operation of the switching device 252, and the control signal $\phi 24$ for controlling an ON-OFF operation of the switching device 254. The control signal generating unit 272 supplies the control signal $\phi 22$ to the switching device 252. The control signal generating unit 272 supplies the control signal $\phi 24$ to the switching device 254.

The control signal generating unit 272 may generate the control signal $\phi 22$ and the control signal $\phi 24$ such that the switching device 252 and the switching device 254 alternately repeat ON-OFF operations. Thereby, the switching device 252 and the switching device 254 can be allowed to perform ON-OFF operations alternately. The control signal $\phi 22$ and the control signal $\phi 24$ may each be a square wave with a duty ratio of 50%. The duty ratio may be calculated as a ratio of an ON period in relation to the cycle of the square wave.

The control signal generating unit 272 may be a pulse generator that generates a pulse string with a predetermined cycle. The control signal generating unit 272 may be a variable pulse generator that controls variation of the duty ratio of at least either one of the control signal $\phi 22$ and the control signal $\phi 24$. The control signal generating unit 272 may be formed on a substrate for the switching device 252 and the switching device 254.

The control signal generating unit 272 has a reference voltage input terminal 274 electrically connected to the positive electrode side of the electricity storage cell 222, and a reference voltage input terminal 276 electrically connected to the negative electrode side of the electricity storage cell 224. The reference voltage input terminal 274 may be an example of a first reference voltage input terminal. The reference voltage input terminal 276 may be an example of a second reference voltage input terminal.

The diode 282 is provided in parallel with the switching device 252. The diode 282 has one end electrically connected to the other end of the inductor 250. The other end of the diode 282 is electrically connected to the positive electrode side of the electricity storage cell 222. The diode 282 allows current to flow in a direction from the other end of the inductor 250 to the positive electrode side of the electricity storage cell 222.

The diode 284 is provided in parallel with the switching device 254. The diode 284 has one end electrically connected to the negative electrode side of the electricity storage cell 224. The other end of the diode 284 is electrically connected to the other end of the inductor 250. The diode 284 allows current to flow in a direction from the negative electrode side of the electricity storage cell 224 to the other end of the inductor 250. The diode 282 and the diode 284 may be parasitic diodes formed equivalently between a source electrode and a drain electrode of a MOSFET.

By providing the diode 282 and the diode 284, the inductor current IL can keep flowing through the diode 282 and the diode 284 even when the inductor current IL becomes stagnant in a period when the switching device 252 and the switching device 254 are both in an OFF-state. Thereby, the inductor current IL that has been once generated in the inductor 250 can be used without being wasted. Also, generation of a surge voltage that may be generated when the inductor current IL is cut off can be suppressed.

The zener diode 292 keeps a voltage difference between voltages of the reference voltage input terminal 274 and the reference voltage input terminal 276 to be within a predetermined range. The zener diode 292 may be provided in parallel with the control signal generating unit 272.

The zener diode 292 may have one end electrically connected to the other end of the inductor 250. The other end of the zener diode 292 may be electrically connected to the reference voltage input terminal 276 of the control signal generating unit 272. The zener diode 292 may be oriented such that when a voltage difference between voltages of the one end of and the other end of the zener diode 292 is larger than a predetermined value, current is allowed to flow from the one end of the zener diode 292 to the other end of the zener diode 292.

Thereby, a voltage difference between voltages of the reference voltage input terminal 274 and the reference voltage input terminal 276 can be kept within a predetermined range. As a result, damages to the control signal generating unit 272 can be prevented.

The zener diode 294 keeps a voltage difference between voltages of the reference voltage input terminal 274 and the reference voltage input terminal 276 to be within a predetermined range. The zener diode 294 may be provided in parallel with the control signal generating unit 272.

The zener diode 294 may have one end electrically connected to the reference voltage input terminal 274 of the control signal generating unit 272. The other end of the zener diode 292 may be electrically connected to the other end of the inductor 250. The zener diode 294 may be oriented such that when a voltage difference between voltages of the one end of and the other end of the zener diode 294 is larger than a predetermined value, current is allowed to flow from the one end of the zener diode 294 to the other end of the zener diode 294.

Thereby, a voltage difference between voltages of the reference voltage input terminal 274 and the reference voltage input terminal 276 can be kept within a predetermined range. As a result, damages to the control signal generating unit 272 can be prevented.

In the present embodiment, the balance correcting circuit 232 includes the zener diode 292 and the zener diode 294. However, the configuration of the balance correcting circuit 232 is not limited thereto. The balance correcting circuit 232 may include at least either one of the zener diode 292 and the zener diode 294.

Figure 3:
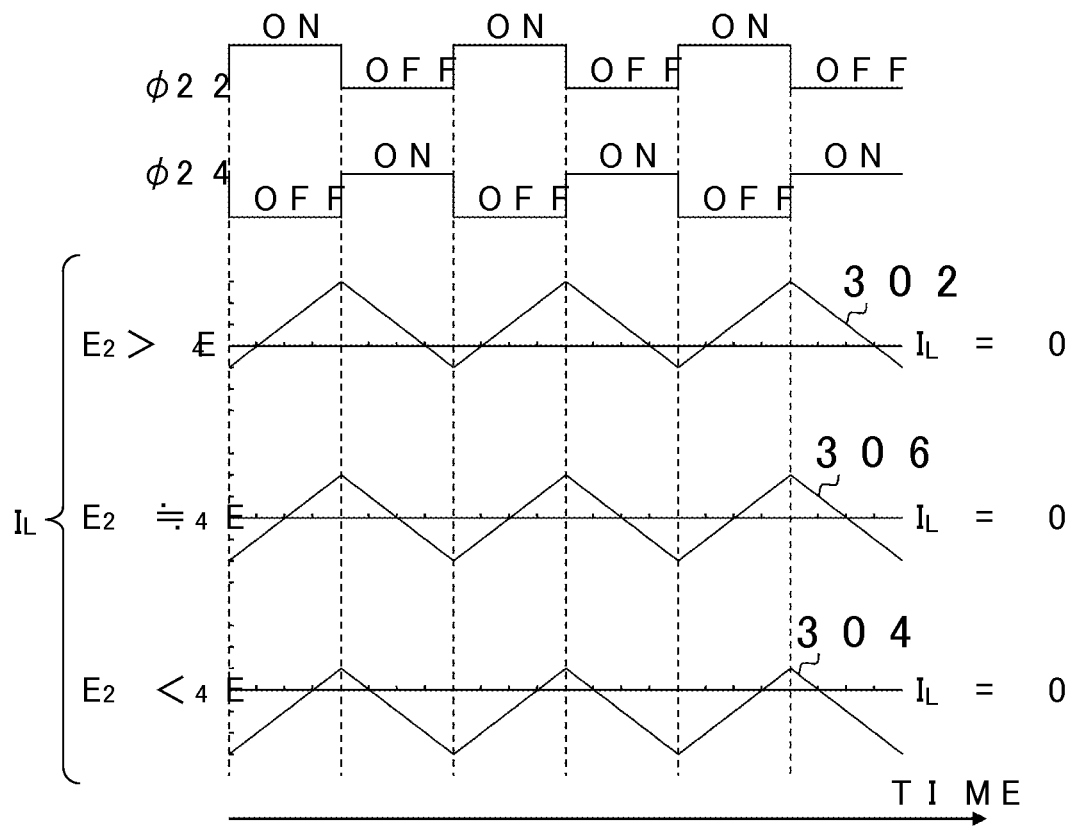
FIG. 3 schematically shows an example of an operation of the electricity storage system 210.

FIG. 3 schematically shows an example of an operation of the electricity storage system 210. FIG. 3 shows a graph 302, a graph 304, and a graph 306 in association with an example of waveforms of the control signal φ22 and the control signal φ24. The horizontal axis of the graph 302, the graph 304, and the graph 306 indicates elapse of time. Also, the vertical axis indicates magnitude of the inductor current IL. In FIG. 3, the magnitude of the inductor current IL is positive when current flows in a direction (indicated with a solid arrow in FIG. 2) from the connection point 263 to the connection point 243.

First, an operation of the electricity storage system 210 in a normal situation is explained with reference to FIG. 3. The graph 302 schematically shows an example of changes of the inductor current IL over time when a voltage E2 of the electricity storage cell 222 is higher than a voltage E4 of the electricity storage cell 224. The graph 304 schematically shows an example of changes of the inductor current IL over time when the voltage E2 of the electricity storage cell 222 is lower than the voltage E4 of the electricity storage cell 224. The graph 306 schematically shows changes of the inductor current IL over time when the voltage E2 of the electricity storage cell 222 is substantially the same with the voltage E4 of the electricity storage cell 224.

In FIG. 3, the control signal φ22 and the control signal φ24 are square waves with duty ratios of 50%. As shown in FIG. 3, the control signal φ22 and the control signal φ24 have complementary logics or phase polarity such that when either one of the switching device 252 and the switching device 254 is in an ON-state, the other one is in an OFF-state.

As shown in the graph 302, when the voltage E2 of the electricity storage cell 222 is higher than the voltage E4 of the electricity storage cell 224, and the switching device 252 is in an ON-state, current flows in a current path from the positive electrode side of the electricity storage cell 222 through the switching device 252, the connection point 263, the inductor 250, and the connection point 243 to the negative electrode side of the electricity storage cell 222. At this time, the inductor 250 is charged with the inductor current IL flowing in a direction indicated with the solid arrow in FIG. 2.

Next, when the switching device 252 enters an OFF-state, and the switching device 254 enters an ON-state, the inductor current IL charged in the inductor 250 is discharged in a current path from the one end of the inductor 250 through the connection point 243, the electricity storage cell 224, the switching device 254, and the connection point 263 to the other end of the inductor 250. This discharge proceeds while charging the electricity storage cell 224. As shown in FIG. 3, the inductor current IL lowers due to the discharge along with the elapse of time, and when the discharging current becomes 0, charging current is allowed to flow through the inductor 250 in an opposite direction to the discharging current.

As shown in the graph 304, when the voltage E2 of the electricity storage cell 222 is lower than the voltage E4 of the electricity storage cell 224, and the switching device 254 is in an ON-state, current is allowed to flow in a current path from the positive electrode side of the electricity storage cell 224 through the connection point 243, the inductor 250, the connection point 263, and the switching device 254 to the negative electrode side of the electricity storage cell 224. At this time, the inductor 250 is charged with the inductor current IL flowing in a direction indicated with a dashed arrow in FIG. 2.

Next, when the switching device 254 enters an OFF-state, and the switching device 252 enters an ON-state, the inductor current IL charged in the inductor 250 is discharged in a current path from the other end of the inductor 250 through the connection point 263, the switching device 252, the electricity storage cell 222, and the connection point 243 to the one end of the inductor 250. This discharge proceeds while charging the electricity storage cell 222.

As described above, because the balance correcting circuit 232 allows current to flow alternately through the first opening/closing circuit and through the second opening/closing circuit, the electricity storage cell 122 and the electricity storage cell 124 can mutually exchange electric energy via the inductor 250. As a result, voltages of the electricity storage cell 122 and the electricity storage cell 124 can be equalized.

As shown in the graph 306, when the voltage E2 of the electricity storage cell 222 and the voltage E4 of the electricity storage cell 224 are substantially the same, and the switching device 252 or the switching device 254 is in an ON-state, the inductor current IL is discharged and charged to substantially the same degrees. As a result, the voltages can be kept substantially balanced.

Note that, in the present embodiment, the duty ratios of the control signal φ22 and the control signal φ24 are 50% for simplifying explanation. However, the duty ratios of the control signal φ22 and the control signal φ24 are not limited thereto. The duty ratios of the control signal φ22 and the control signal φ24 may be varied according to a voltage difference between voltages of the electricity storage cell 222 and the electricity storage cell 224.

Next, functions of the zener diode 292 and the zener diode 294 when the connection of the electricity storage cell 222 and the electricity storage cell 224 with the balance correcting circuit 232 is disconnected during operation of the electricity storage system 210 are explained. A high voltage may be applied between the reference voltage input terminal 274 and the reference voltage input terminal 276 of the control signal generating unit 272 depending on timing of disconnection of the connection between the electricity storage cell 222 and the electricity storage cell 224 with the balance correcting circuit 232.

The zener diode 292 protects the control signal generating unit 272 when the connection between the electricity storage cell 222 and the balance correcting apparatus is disconnected in a case where the voltage E2 of the electricity storage cell 222 is lower than the voltage E4 of the electricity storage cell 224, the switching device 252 is in an ON-state, the switching device 254 is in an OFF-state, and the inductor current IL is flowing in the direction indicated with the dashed arrow in FIG. 2. The zener diode 294 protects the control signal generating unit 272 when the connection between the electricity storage cell 224 and the balance correcting apparatus is disconnected in a case where the voltage E2 of the electricity storage cell 222 is higher than the voltage E4 of the electricity storage cell 224, the switching device 252 is in an OFF-state, the switching device 254 is in an ON-state, and the inductor current IL is flowing in the direction indicated with the solid arrow in FIG. 2.

First, the function of the zener diode 292 is explained. It is assumed that the voltage E2 of the electricity storage cell 222 is lower than the voltage E4 of the electricity storage cell 224, the switching device 252 is in an ON-state, the switching device 254 is in an OFF-state, and the inductor current IL is flowing in the direction indicated with the dashed arrow in FIG. 2.

When the connection between the electricity storage cell 222 and the balance correcting apparatus is disconnected in this state, the inductor current IL flows in a current path from the other end of the inductor 250 through the connection point 263, the switching device 252, the reference voltage input terminal 274, the control signal generating unit 272, the reference voltage input terminal 276, the electricity storage cell 224, and the connection point 243 to the one end of the inductor 250 in the absence of the zener diode 292. Depending on the magnitude of the inductor current IL, damages may be caused to the control signal generating unit 272.

On the contrary, when the zener diode 292 is provided as explained with reference to FIG. 2, the inductor current IL flows in a current path from the other end of the inductor 250 through the connection point 263, the zener diode 292, the electricity storage cell 224, and the connection point 243 to the one end of the inductor 250. Thereby, damages to the control signal generating unit 272 can be prevented.

Next, the function of the zener diode 294 is explained. It is assumed that the voltage E2 of the electricity storage cell 222 is higher than the voltage E4 of the electricity storage cell 224, the switching device 252 is in an OFF-state, the switching device 254 is in an ON-state, and the inductor current IL is flowing in the direction indicated with the solid arrow in FIG. 2.

When the connection between the electricity storage cell 224 and the balance correcting apparatus is disconnected in this state, the inductor current IL flows in a current path from the one end of the inductor 250 through the connection point 243, the electricity storage cell 222, the reference voltage input terminal 274, the control signal generating unit 272, the reference voltage input terminal 276, the switching device 254, and the connection point 263 to the other end of the inductor 250 in the absence of the zener diode 294. Depending on the magnitude of the inductor current IL, damages may be caused to the control signal generating unit 272.

On the contrary, when the zener diode 294 is provided as explained with reference to FIG. 2, the inductor current IL flows in a current path from the one end of the inductor 250 through the connection point 243, the electricity storage cell 222, the zener diode 294, the connection point 263 to the other end of the inductor 250. Thereby, damages to the control signal generating unit 272 can be prevented.

Figure 4:
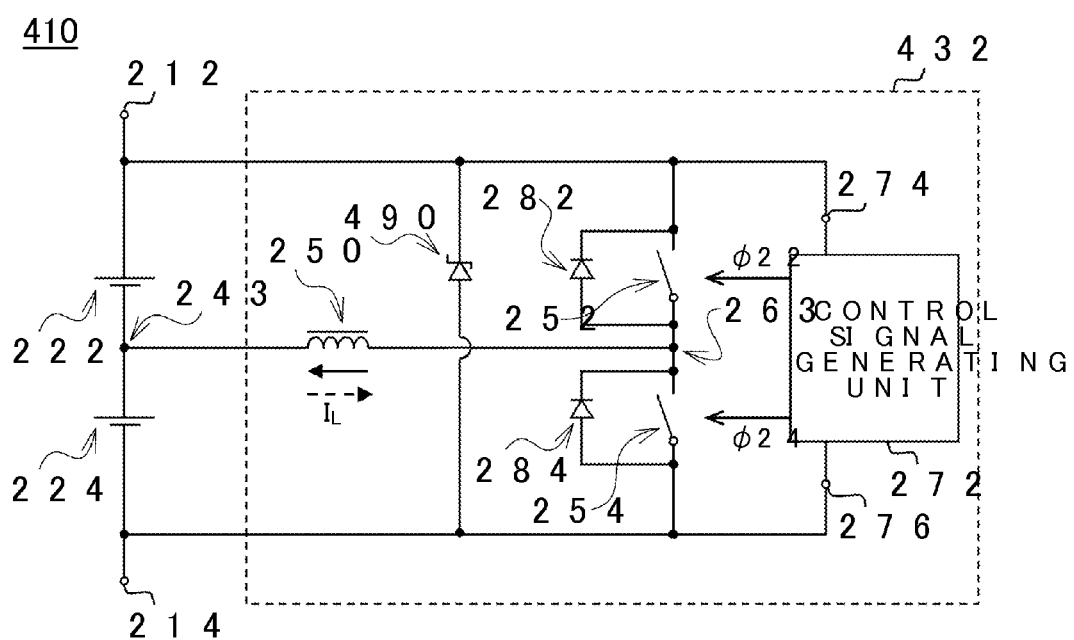
FIG. 4 schematically shows an example of an electricity storage system 410.

FIG. 4 schematically shows an example of an electricity storage system 410. The electricity storage system 410 includes the terminal 212, the terminal 214, the electricity storage cell 222 and the electricity storage cell 224 that are connected in series, and a balance correcting circuit 432. The balance correcting circuit 432 may be an example of a balance correcting apparatus.

The balance correcting circuit 432 equalizes voltages of the electricity storage cell 222 and the electricity storage cell 224. The balance correcting circuit 432 includes the inductor 250, the switching device 252, the switching device 254, the control signal generating unit 272, the diode 282, the diode 284, and a zener diode 490.

The balance correcting circuit 432 is different from the balance correcting circuit 232 in that the balance correcting circuit 432 includes a zener diode 490 in place of the zener diode 292 and the zener diode 294. In other respects, the balance correcting circuit 432 may have the same configuration with that of the balance correcting circuit 232. The same or similar parts with or to parts of the balance correcting circuit 232 are provided with the same reference numerals, and explanation thereof is not repeated. Also, the electricity storage system 110 may have the same configuration as that of the electricity storage system 410. The balance correcting circuit 132, the balance correcting circuit 134, and the balance correcting circuit 136 may have the same configurations with that of the balance correcting circuit 432.

The zener diode 490 keeps a voltage difference between voltages of the reference voltage input terminal 274 and the reference voltage input terminal 276 to be within a predetermined range. The zener diode 490 has one end electrically connected to the reference voltage input terminal 274. The other end of the zener diode 490 is electrically connected to the reference voltage input terminal 276. The zener diode 490 may be provided in parallel with the control signal generating unit 272.

The zener diode 490 may have one end electrically connected between the positive electrode side of the electricity storage cell 222 and the switching device 252. The other end of the zener diode 490 may be electrically connected between the negative electrode side of the electricity storage cell 224 and the switching device 254. The zener diode 490 may be oriented such that when a voltage difference between voltages of the one end of and the other end of the zener diode 490 is larger than a predetermined value, current is allowed to flow from the one end of the zener diode 490 to the other end of the zener diode 490.

Next, a function of the zener diode 490 is explained. It is assumed that the voltage E2 of the electricity storage cell 222 is higher than the voltage E4 of the electricity storage cell 224, the switching device 252 is in an OFF-state, the switching device 254 is in an ON-state, and the inductor current IL is flowing in a direction indicated with a solid arrow in FIG. 4. Even when the connection between the electricity storage cell 224 and the balance correcting apparatus is disconnected in this state, the inductor current IL flows in a current path from the one end of the inductor 250 through the connection point 243, the electricity storage cell 222, the zener diode 490, the switching device 254, the connection point 263 to the other end of the inductor 250 if the zener diode 490 is provided as explained above. Thereby, damages to the control signal generating unit 272 can be prevented.

Also, it is assumed that the voltage E2 of the electricity storage cell 222 is lower than the voltage E4 of the electricity storage cell 224, the switching device 252 is in an ON-state, the switching device 254 is in an OFF-state, and the inductor current IL is flowing in a direction indicated with a dashed arrow in FIG. 4. Even when the connection between the electricity storage cell 222 and the balance correcting apparatus is disconnected in this state, the inductor current IL flows in a current path from the other end of the inductor 250 through the connection point 263, the switching device 252, the zener diode 490, the electricity storage cell 224, and the connection point 243 to the one end of the inductor 250 if the zener diode 490 is provided as explained above. Thereby, damages to the control signal generating unit 272 can be prevented.

As explained above, the zener diode 490 can keep a voltage difference between voltages of the reference voltage input terminal 274 and the reference voltage input terminal 276 to be within a predetermined range. As a result, damages to the control signal generating unit 272 can be prevented.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A balance correcting apparatus that equalizes voltages of a first electricity storage cell and a second electricity storage cell that are connected in series, the balance correcting apparatus comprising:
    an inductor having one end that is electrically connected to a connection point between one end of the first electricity storage cell and one end of the second electricity storage cell;
    a first switching device that is electrically connected between the other end of the inductor and the other end of the first electricity storage cell;
    a second switching device that is electrically connected between the other end of the inductor and the other end of the second electricity storage cell;
    a control signal generating unit that has a first reference voltage input terminal electrically connected to the other end of the first electricity storage cell and a second reference voltage input terminal electrically connected to the other end of the second electricity storage cell, and supplies, to the first switching device and the second switching device, a control signal for controlling an ON-OFF operation of the first switching device and the second switching device to allow the first switching device and the second switching device to perform an ON-OFF operation alternately; and
    a shunt regulator having one end electrically connected to the other end of the inductor and another end electrically connected to the second reference voltage input terminal of the control signal generating unit, the shunt regulator allowing current to flow from the one end of the shunt regulator to the other end of the shunt regulator when a voltage difference between voltages of the one end of and the other end of the shunt regulator is larger than a predetermined value.

2. A balance correcting apparatus that equalizes voltages of a first electricity storage cell and a second electricity storage cell that are connected in series, the balance correcting apparatus comprising:
    an inductor having one end that is electrically connected to a connection point between one end of the first electricity storage cell and one end of the second electricity storage cell;
    a first switching device that is electrically connected between the other end of the inductor and the other end of the first electricity storage cell;
    a second switching device that is electrically connected between the other end of the inductor and the other end of the second electricity storage cell;
    a control signal generating unit that has a first reference voltage input terminal electrically connected to the other end of the first electricity storage cell and a second reference voltage input terminal electrically connected to the other end of the second electricity storage cell, and supplies, to the first switching device and the second switching device, a control signal for controlling an ON-OFF operation of the first switching device and the second switching device to allow the first switching device and the second switching device to perform an ON-OFF operation alternately; and a shunt regulator having one end electrically connected to the first reference voltage input terminal of the control signal generating unit and another end electrically connected to the other end of the inductor, the shunt regulator allowing current to flow from the one end of the shunt regulator to the other end of the shunt regulator when a voltage difference between voltages of the one end of and the other end of the shunt regulator is larger than a predetermined value.

3. A balance correcting apparatus that equalizes voltages of a first electricity storage cell and a second electricity storage cell that are connected in series, the balance correcting apparatus comprising:

an inductor having one end that is electrically connected to a connection point between one end of the first electricity storage cell and one end of the second electricity storage cell;

a first switching device that is electrically connected between the other end of the inductor and the other end of the first electricity storage cell;

a second switching device that is electrically connected between the other end of the inductor and the other end of the second electricity storage cell;

a control signal generating unit that has a first reference voltage input terminal electrically connected to the other end of the first electricity storage cell and a second reference voltage input terminal electrically connected to the other end of the second electricity storage cell, and supplies, to the first switching device and the second switching device, a control signal for controlling an ON-OFF operation of the first switching device and the second switching device to allow the first switching device and the second switching device to perform an ON-OFF operation alternately;

a first diode that is provided in parallel with the first switching device, and allows current to flow in a direction from the other end of the inductor to the other end of the first electricity storage cell;

a second diode that is provided in parallel with the second switching device, and allows current to flow in a direction from the other end of the second electricity storage cell to the other end of the inductor; and a shunt regulator having one end electrically connected to the first reference voltage input terminal and another end electrically connected to the second reference voltage input terminal, the shunt regulator allowing current to flow from the one end of the shunt regulator to the other end of the shunt regulator when a voltage difference between voltages of the one end of and the other end of the shunt regulator is larger than a predetermined value.

4. The balance correcting apparatus according to claim 1, wherein the shunt regulator includes a zener diode.

5. An electricity storage system comprising:
a first electricity storage cell and a second electricity storage cell that are connected in series, and
the balance correcting apparatus according to claim 1 that equalizes voltages of the first electricity storage cell and the second electricity storage cell.

6. The balance correcting apparatus according to claim 4, wherein the zener diode has one end electrically connected to the other end of the inductor and another end electrically connected to the second reference voltage input terminal of the control signal generating unit, the zener diode allowing current to flow from the one end of the zener diode to the other end of the zener diode when a voltage difference between voltages of the one end of and the other end of the zener diode is larger than a predetermined value.

7. An electricity storage system comprising:
a first electricity storage cell and a second electricity storage cell that are connected in series, and
the balance correcting apparatus according to claim 2 that equalizes voltages of the first electricity storage cell and the second electricity storage cell.

8. The balance correcting apparatus according to claim 2, wherein the shunt regulator includes a zener diode having one end electrically connected to the first reference voltage input terminal of the control signal generating unit and another end electrically connected to the other end of the inductor, the zener diode allowing current to flow from the one end of the zener diode to the other end of the zener diode when a voltage difference between voltages of the one end of and the other end of the zener diode is larger than a predetermined value.

9. An electricity storage system comprising:
a first electricity storage cell and a second electricity storage cell that are connected in series, and
the balance correcting apparatus according to claim 3 that equalizes voltages of the first electricity storage cell and the second electricity storage cell.

10. The balance correcting apparatus according to claim 3, wherein the shunt regulator includes a zener diode having one end electrically connected to the first reference voltage input terminal and another end electrically connected to the second reference voltage input terminal, the zener diode allowing current to flow from the one end of the zener diode to the other end of the zener diode when a voltage difference between voltages of the one end of and the other end of the zener diode is larger than a predetermined value.

11. The balance correcting apparatus according to claim 10, wherein the one end of the zener diode is electrically connected between the other end of the first electricity storage cell and the first switching device, and the other end of the zener diode is electrically connected between the other end of the second electricity storage cell and the second switching device.

* * * * *